US007645050B2

(12) United States Patent
Wilt et al.

(10) Patent No.: US 7,645,050 B2
(45) Date of Patent: Jan. 12, 2010

(54) USER-WEARABLE ILLUMINATION ASSEMBLY

(75) Inventors: Brian L. Wilt, Middleton, WI (US);
Patrick Shipley, Sun Prairie, WI (US);
Frederick N. Bushroe, Tucson, AZ (US); Kevin Garcia, Tucson, AZ (US)

(73) Assignee: Kerr Corporation, Orange, CA (US)

( * ) Notice: Subject to any disclaimer, the term of this patent is extended or adjusted under 35 U.S.C. 154(b) by 52 days.

(21) Appl. No.: 11/562,325

(22) Filed: Nov. 21, 2006

(65) Prior Publication Data

US 2007/0153498 A1  Jul. 5, 2007

Related U.S. Application Data

(60) Provisional application No. 60/739,870, filed on Nov. 23, 2005.

(51) Int. Cl.
*F21V 21/08* (2006.01)
*F21S 8/08* (2006.01)
*F21S 4/00* (2006.01)

(52) U.S. Cl. .................. 362/103; 362/105; 362/418; 362/419; 362/570; 362/572

(58) Field of Classification Search ............... 362/103, 362/551, 105, 396, 570, 572, 573, 581, 427, 362/253, 106, 418–419, 449, 436, 438; 248/276.1, 248/278.1, 689, 902
See application file for complete search history.

(56) References Cited

U.S. PATENT DOCUMENTS 2,282,167 A * 5/1942 Cullman .................. 362/188
3,285,242 A * 11/1966 Wallace .................. 600/249
3,951,139 A * 4/1976 Kloots .................... 600/249

(Continued)

FOREIGN PATENT DOCUMENTS

FR  2 775 513 A1  9/1999

(Continued)

OTHER PUBLICATIONS

European Search Report and Written Opinion in Patent Application No. 06256006.5 dated Aug. 20, 2007.

(Continued)

*Primary Examiner*—Sharon E Payne
*Assistant Examiner*—Sean P Gramling
(74) *Attorney, Agent, or Firm*—Wood, Herron & Evans, LLP

(57) ABSTRACT

A user-wearable illumination assembly comprises a mounting fixture that is adapted to be coupled to a user-wearable device, such as eyeglasses, goggles, face masks, helmets, or other devices. A light guide has a first end that can be coupled to a light source, and a second end coupled to a lens housing that is in turn coupled to the mounting fixture. An optical lens in the lens housing cooperates with the light guide to project light from the light source through the lens. In one embodiment, the lens has a substantially spherical surface facing the second end of the light guide and an aspheric surface facing away from the second end of the light guide. In another embodiment, the mounting fixture comprises articulating portions to permit independent or simultaneous adjustment of the lens housing to direct projected light in a desired direction.

13 Claims, 8 Drawing Sheets

U.S. PATENT DOCUMENTS

| | | | |
|---|---|---|---|
| 4,156,942 A * | 6/1979 | Isfeld | 2/422 |
| 4,838,678 A * | 6/1989 | Hubertus | 351/205 |
| 5,268,977 A | 12/1993 | Miller | |
| 5,430,620 A | 7/1995 | Li et al. | |
| 5,667,291 A | 9/1997 | Caplan et al. | |
| 6,012,827 A * | 1/2000 | Caplan et al. | 362/396 |
| 6,280,058 B1 * | 8/2001 | Horigome | 362/268 |
| 6,896,389 B1 | 5/2005 | Paul | |
| 6,917,738 B2 | 7/2005 | Guerra et al. | |
| 6,955,444 B2 | 10/2005 | Gupta | |

FOREIGN PATENT DOCUMENTS

| | | |
|---|---|---|
| GB | 1 019 285 | 2/1966 |
| GB | 2 245 053 A | 12/1991 |
| WO | 96/17206 A1 | 6/1996 |
| WO | 96/37730 A1 | 11/1996 |

OTHER PUBLICATIONS

European Patent Office, Office Action in European Patent Application No. 06256006.5 dated Nov. 13, 2008.

* cited by examiner

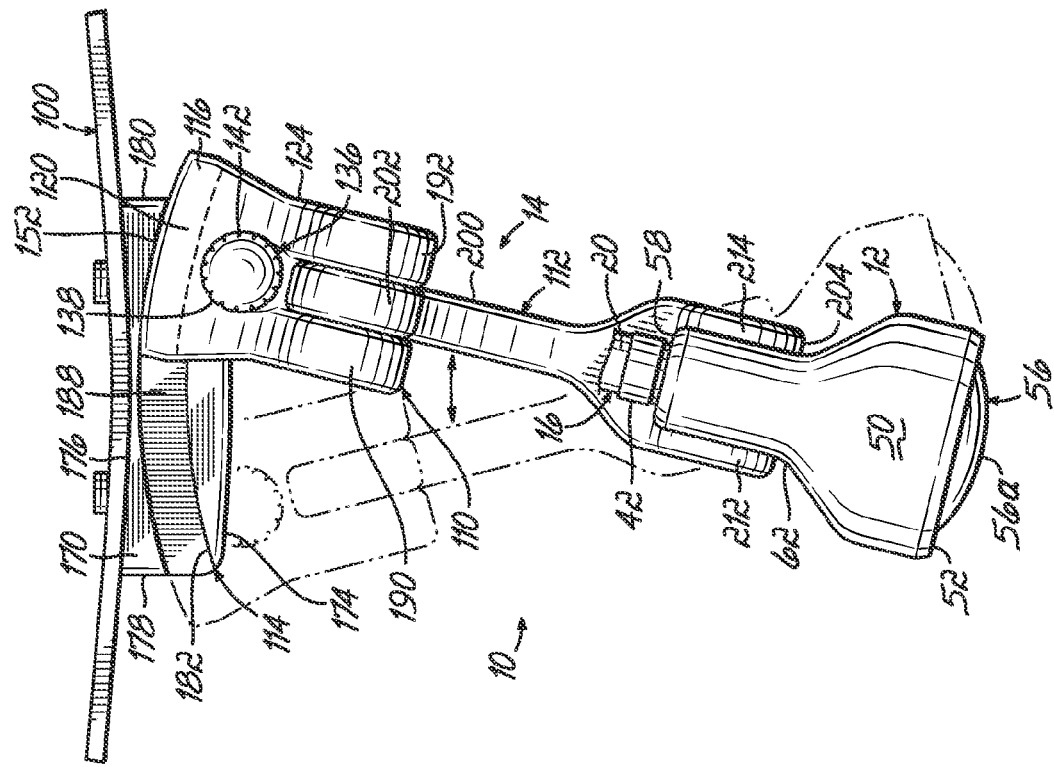
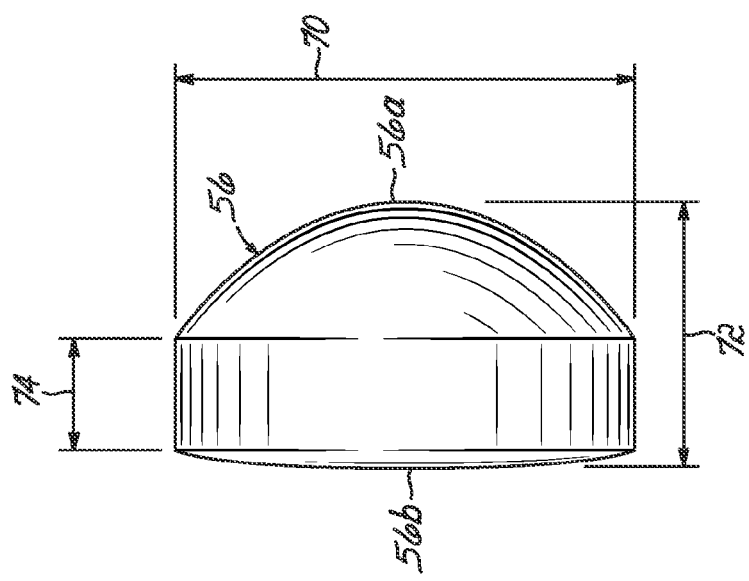
FIG. 13
FIG. 4

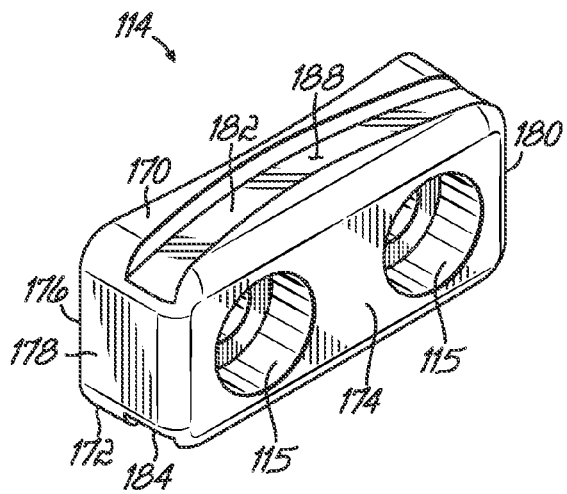
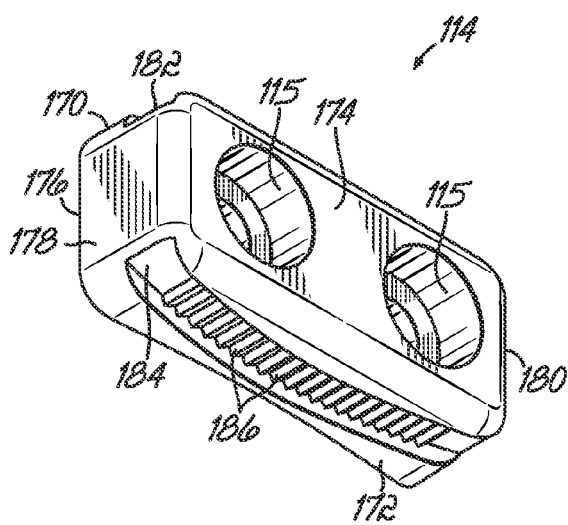
FIG. 8        FIG. 9
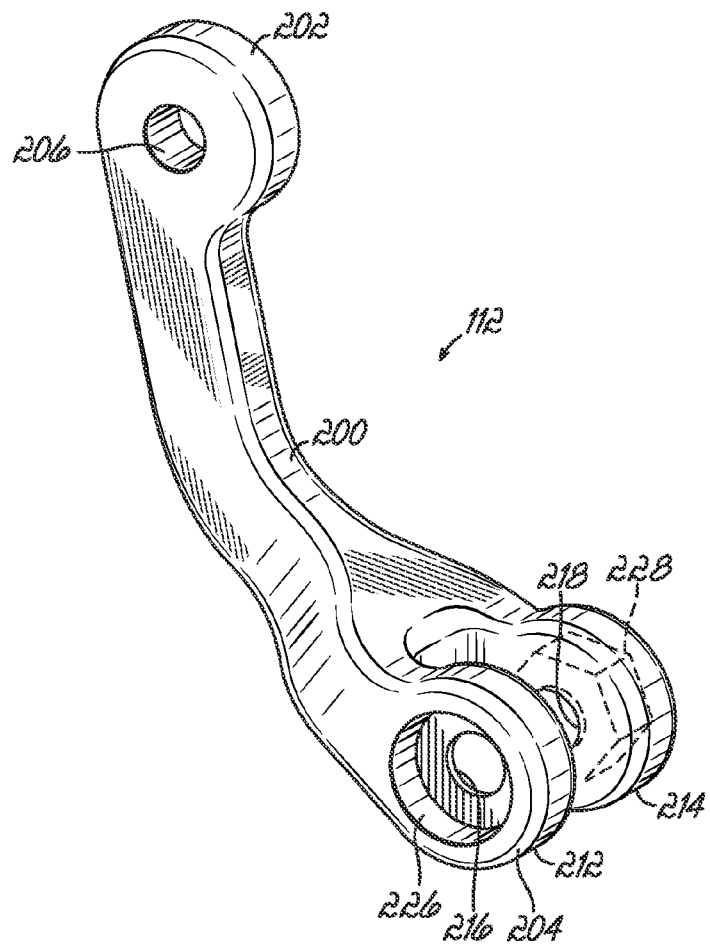
FIG. 10

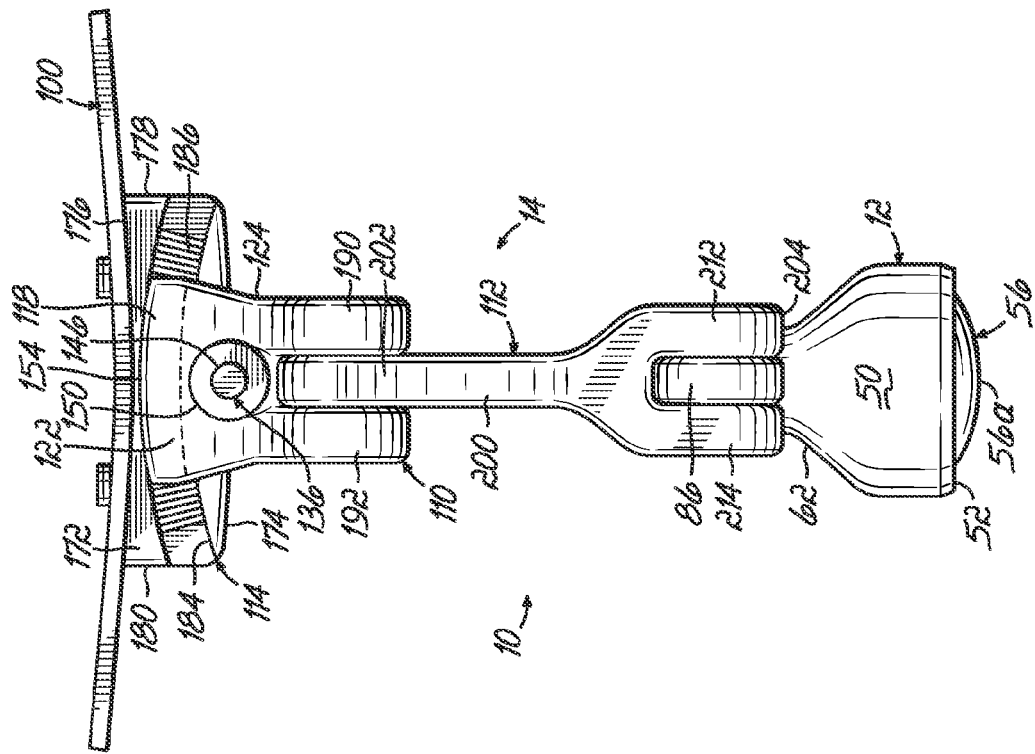
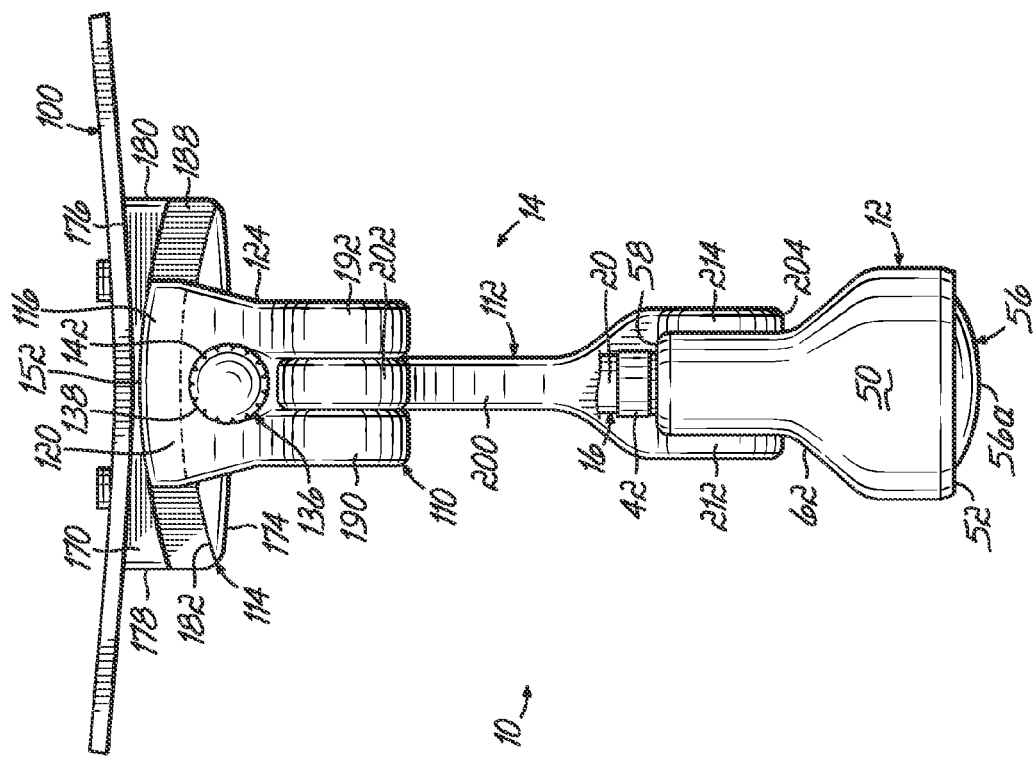

USER-WEARABLE ILLUMINATION ASSEMBLY

This application claims priority to U.S. Provisional Application Ser. No. 60/739,870, filed Nov. 23, 2005, incorporated by reference herein in its entirety.

TECHNICAL FIELD

The present invention relates generally to medical and dental devices, and more particularly to a user-wearable illumination device for medical and dental purposes.

BACKGROUND

User-wearable illumination devices are known in the art for providing illumination to assist practitioners during the performance of various medical and/or dental procedures. For example, U.S. Pat. No. 5,667,291 to Caplan et al. discloses a lightweight, user-wearable illumination assembly that can be removably attached to user-wearable devices, such as eyeglasses, face shields, headbands, or various other devices. U.S. Pat. No. 5,667,291 is commonly owned by the assignee of the present application, and is incorporated by reference herein in its entirety. The illumination device disclosed therein utilizes a light guide, such as a fiber optic cable, to provide illumination from a remote illumination source.

While prior illumination devices have been developed to overcome various drawbacks of previously available lighting implements, further improvements to such user-wearable illumination devices is desired to make the devices even more compact and lightweight, without sacrificing performance.

SUMMARY

In one embodiment, a user-wearable illumination assembly includes a lens housing that can be mounted by a mounting fixture to a user-wearable device, such as a pair of goggles, a pair of eyeglasses, a face shield, a helmet, or other devices. A light guide has a first end that can be coupled to a light source, and a second end that is coupled to the lens housing. An optical lens disposed within the lens housing has a substantially spherical surface that faces the second end of the light guide, and an aspheric surface that faces away from the second end of the light guide. The lens cooperates with the light guide to project light from the light source through the lens to provide a bright illumination of a desired target area. The illumination assembly is small in size and is lightweight to provide increased comfort for users, particularly during the performance of surgical and/or medical procedures.

In another embodiment, the mounting fixture comprises first, second, and third portions that provide articulation of the illumination assembly. The first portion is adapted to be coupled to the user-wearable device. The second portion is coupled to the first portion for pivotal movement about a first axis, and the third portion is coupled to the second portion for pivotal movement about a second axis that is orthogonal to the first axis. In this arrangement, the illumination assembly may be easily adjusted to direct light generally along the line-of-sight of the person wearing the device.

In yet another embodiment, the lens housing is coupled to the third portion of the mounting fixture for pivotal movement about a third axis that is substantially parallel to the second axis. This arrangement permits independent or simultaneous adjustment of the lens housing about two horizontal axes, as well as a vertical axis, so that the lens may be precisely oriented as desired.

In another embodiment, the lens may be configured to introduce aberrations into a light spot projected from the lens. When the light guide comprises a bundle of individual fiber optic elements, or otherwise has structure at its end, the aberrations help the projected light appear substantially uniform at the desired target.

These and other features, objects and advantages of the invention will become more readily apparent to those skilled in the art in view of the following detailed description, taken in conjunction with the accompanying drawings.

BRIEF DESCRIPTION OF THE FIGURES

The accompanying drawings, which are incorporated in and constitute a part of this specification, illustrate embodiments of the invention and, together with a general description of the invention given above, and the detailed description given below, serve to explain the principles of the invention.

FIG. 4 is a side elevation view of a lens of the illumination assembly of FIG. 1.

FIG. 8 is a perspective view of a bridge mounting of the illumination assembly of FIG. 1.

FIG. 9 is a perspective view similar to FIG. 8, illustrating the bridge mounting viewed at a lower elevation.

FIG. 10 is a perspective view of a yoke of the illumination assembly of FIG. 1.

FIG. 11 is a top plan view of the illumination assembly of FIG. 1.

FIG. 12 is a bottom plan view of the illumination assembly of FIG. 1.

FIG. 13 is a top plan view similar to FIG. 11, illustrating articulation of the illumination assembly of FIG. 1.

DETAILED DESCRIPTION

Figure 1:
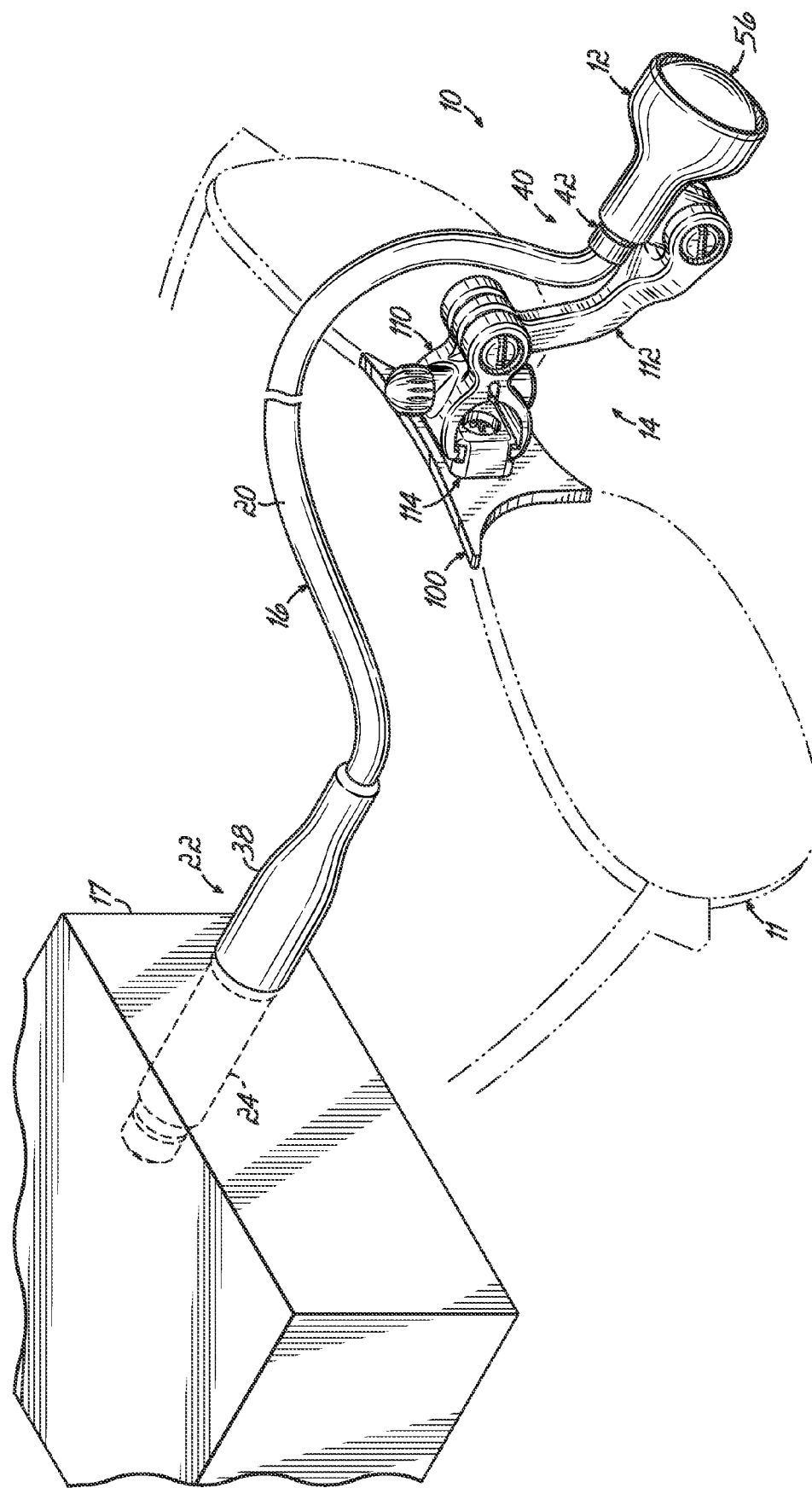
FIG. 1 is a perspective view of an exemplary user-wearable illumination assembly in accordance with the principles of the present invention.
Figure 2:
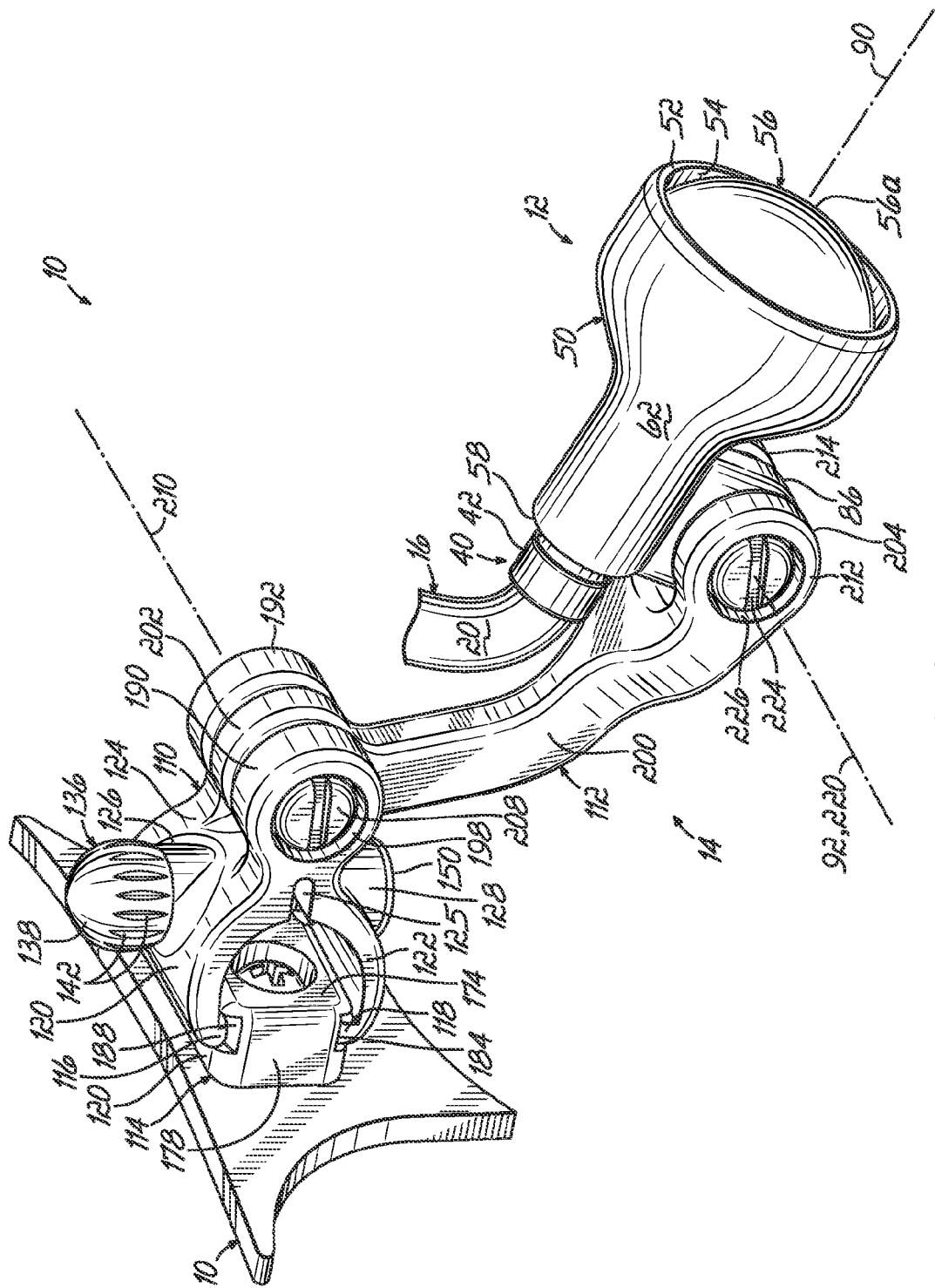
FIG. 2 is an enlarged perspective view of the user-wearable illumination assembly of FIG. 1.
Figure 5:
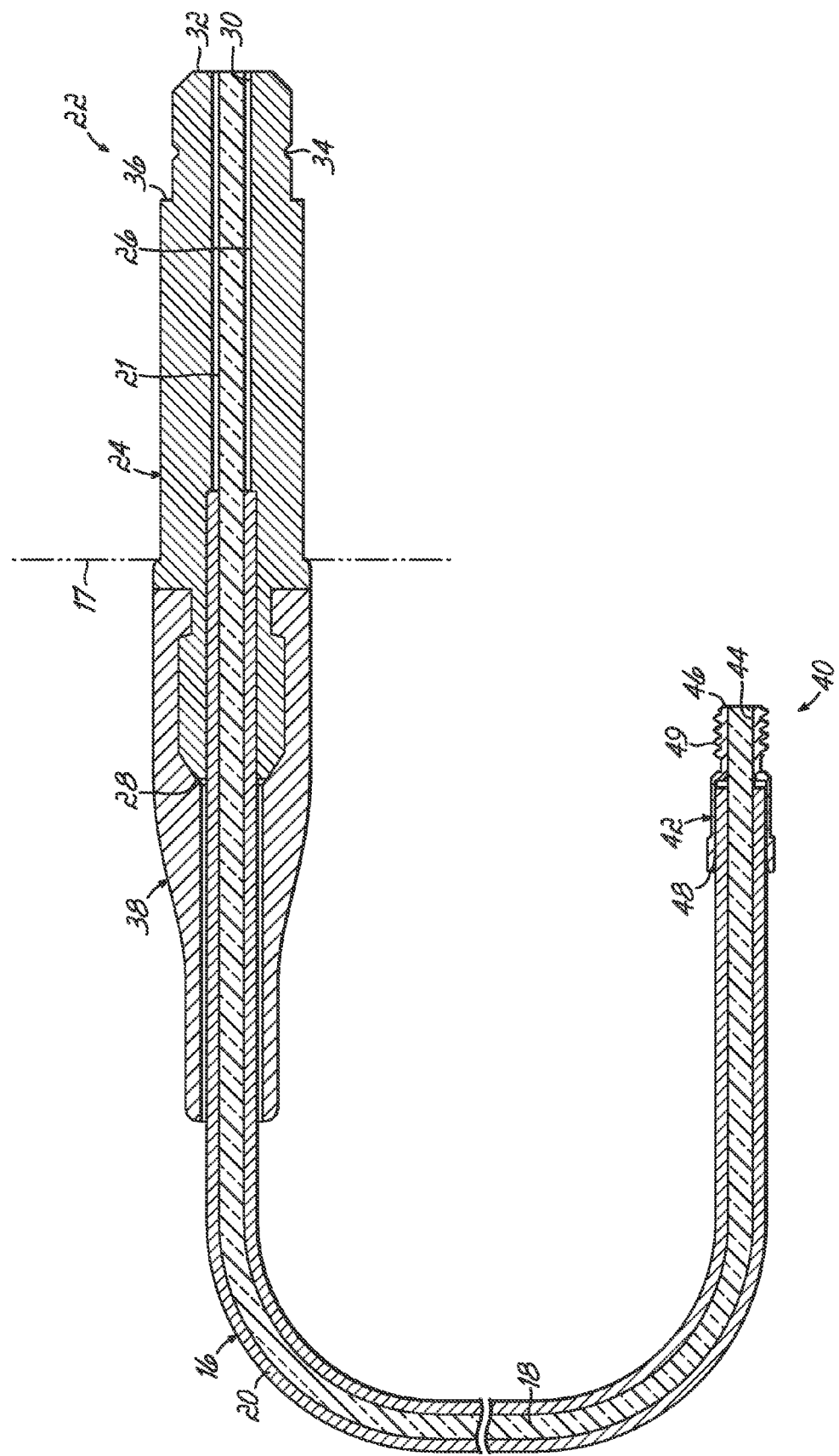
FIG. 5 is a cross-sectional view of a light guide of the illumination assembly of FIG. 1.

FIGS. 1 and 2 depict an exemplary user-wearable illumination assembly 10 in accordance with the principles of the present invention. The illumination assembly 10 includes a lens housing assembly 12 and a mounting fixture 14 for attaching the lens housing assembly 12 to user-wearable devices 11, such as eyeglasses, goggles, face shields, masks, headbands, helmets, or various other user-wearable devices. In the embodiment shown, a flexible light guide 16 extends from the lens housing assembly 12 and is coupled to a light source 17 that is remote from the illumination assembly 10. Referring to FIG. 5, the light guide 16 shown in the figures, comprises a plurality of individual fiber optic strands (depicted in FIG. 5 as a single bundle 18) that are aligned and bundled to form a fiber optic bundle, as known in the art. Alternatively, the light guide 16 may comprise a liquid filled member, a single fiber formed from plastic, glass or other materials, photonic crystals, or various other materials suitable for conducting the light from the light source along a desired path. The light guide 16 has a protective outer cover 20 along its length, comprising a PVC layer and an optional metal monocoil wound around the bundle 18 of fiber optic strands. In one embodiment, the numerical aperture of the fibers is 0.66 and the fiber strands are approximately 50 microns in diameter. The optical diameter of the fiber optic cable is approximately 1.6 millimeters in diameter, which is smaller than fiber optic cables used in conventional illumination assemblies. In another embodiment, the numerical aperture of the fibers may be less than 0.55, such as for example 0.55 or less.

As best depicted in FIGS. 1 and 5, a first end 22 of the light guide 16 is provided with a connector 24 for coupling the light guide 16 to the light source 17. The light source 17 may be a commercially available fiber optic illuminator having, for example, a halogen, xenon, LED, or short-arc metal halide lamp. Short-arc metal halide illuminators are available, for example, from Welch Allyn Medical Products of Skaneateles Falls, N.Y. In the embodiment shown, the connector 24 is a standard ACMI connector having a central channel 26 therethrough, although various other types of connectors may alternatively be used to couple the light guide 16 to a light source. A portion of the protective cover 20 over the fiber optic bundle 18 is stripped away and the first end 21 of the bundle 18 is inserted into a first end 28 of the connector 24 such that only the individual strands extend through the channel 26 toward an aperture 30 at the second end 32 of the connector 24. The connector 24 may be provided with various surface features, such as grooves 34 and/or shoulders 36, to facilitate connecting the first end 22 of the light guide 16 to the light source 17.

An elongate, flexible boot 38 is coupled to the first end 28 of the connector 24 and extends over a portion of the light guide 16 to provide strain relief. In one embodiment, the boot 38 is formed from silicone. It will be recognized, however, that various other elastomeric materials may be used to form the boot 38. Alternatively, the boot 38 may be formed from various other materials suitable for providing strain relief to the light guide 16.

With continued reference to FIGS. 1 and 5, the second end 40 of the light guide 16 is fitted with a threaded ferrule 42 to facilitate coupling the second end 40 to the lens housing assembly 12. In the embodiment shown, the protective cover 20 over the bundle 18 of fiber optic strands is stripped a distance from the second end 40 of the light guide 16 and the exposed strands are inserted through the ferrule 42 to extend toward an aperture 44 in the first end 46 of the ferrule 42. The second end 48 of the ferrule 42 extends over a portion of the bundle 18 and protective cover 20 and is secured to the light guide 16 with adhesive or by other methods. External threads 49 are formed into the first end 46 of the ferrule 42. In the embodiment shown, the ferrule 42 is formed from aluminum and is black anodized. It will be recognized that the ferrule 42 may alternatively be formed from various other materials.

Figure 3:
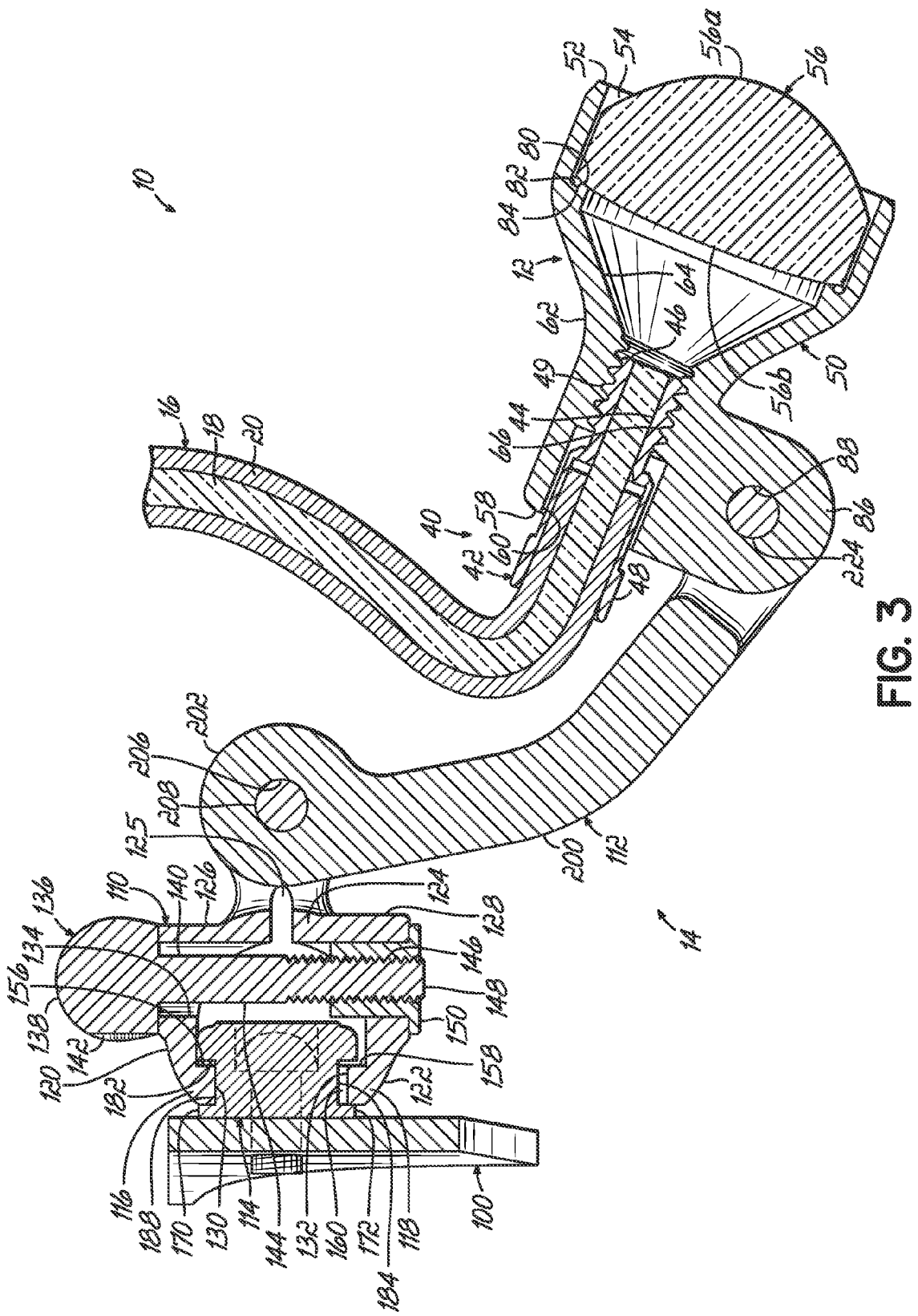
FIG. 3 is a side cross-sectional view of the illumination assembly of FIG. 1.

Referring now to FIGS. 2 and 3, the lens housing assembly 12 includes a lens housing 50 having a first end 52 with generally circular first aperture 54 for receiving a lens 56, and an oppositely disposed second end 58 with a smaller, generally circular second aperture 60 for receiving the second end 40 of the light guide 16. An intermediate portion 62 of the lens housing 50 is tapered to transition between the smaller, second end 58 and the larger, first end 52 of the housing 50. A passage through the lens housing 50 connects the first and second apertures 54, 60. A generally frustoconical surface 64 is defined in the interior of the housing 50 along the tapered intermediate portion 62. The frustoconical surface 64 may have a rough surface finish to facilitate scattering light provided through the second end 40 of the light guide 16. Internal threads 66 provided inside the lens housing 50, adjacent the second aperture 60, are configured to correspond to the external threads 49 formed on the ferrule 42 at the second end 40 of the light guide 16. Accordingly, the second end 40 of the light guide 16 may be threaded into the lens housing 50 to form a secure connection therebetween.

The first aperture 54 in the first end 52 of the lens housing 50 is sized to receive an optical lens 56 which collects light from the light guide 16 and projects the light to a location forward of the first end 52 of the lens housing 50. In the embodiment shown, the optical lens 56 is an aspheric lens a depicted in FIG. 4. The lens 56 has a major diameter 70 of approximately 12.7 millimeters and a center thickness 72 of approximately 7.5 millimeters. The edge thickness 74 of the lens 56 is approximately 3.1 millimeters. The aspheric surface 56a has a clear lens aperture of approximately 11.8 millimeters and a surface profile defined by the conic sag equation:

$$z(\rho) = \frac{\rho^2/R}{1 + \sqrt{1-(1+K)(\rho/R)^2}}$$

wherein:
R=6.10728 (convex radius of curvature, in millimeters)
K=−0.622845 (conic constant)
ρ=the radial position from the optical axis The opposite surface 56b is spherical and has a clear lens aperture of about 11.6 millimeters and a radius of curvature of about 29.8 millimeters. The lens 56 has an effective focal length of approximately 10.4 millimeters and a back focal length of approximately 6 millimeters and is molded from Schott B270 or equivalent glass having an index of refraction ($\eta_d$) of about 1.52 and an abbe dispersion number ($v_d$) of about 58.57. The surfaces of the lens 56 may be coated with an anti-reflective coating.

In an exemplary embodiment, the aspheric configuration of the lens 56 is designed to introduce aberrations into the illumination assembly 10 so that light emanating from the individual fiber optic strands and projected through the lens 56 appears substantially uniform at an intended target distance. For example, the introduced aberrations help to reduce or eliminate visual distinction of individual points of light at the target, resulting from the individual fibers, and to reduce or eliminate any gaps in the individual points of light that may result from the bundling of the fibers or the presence of a broken fiber. The aspheric configuration of the lens 56 also helps to provide a relatively high numerical aperture in a small package size. In one embodiment, the numerical aperture of the lens 56 is selected to substantially correspond to the numerical aperture of the light guide 16. When used with a light source having a lamp that has a numerical aperture substantially corresponding to the numerical apertures of the light guide 16 and lens 56, the light projected from the illumination assembly 10 can be maximized.

Referring to FIG. 3, the lens 56 is mounted into the first aperture 54 of the lens housing 50 and is positioned within the first aperture 54 by an annular shoulder 80 formed on the inside surface of the lens housing 50. An annular groove 82 is provided on the shoulder 80 and is sized to receive a sealing member, such as an O-ring 84. The lens 56 is tightly fitted within the first aperture 54 and compresses the O-ring 84 to thereby seal the interior of the lens housing 50 against infiltration by moisture or gases which may fog or otherwise degrade the optical performance of the illumination assembly 10. In one embodiment, the O-ring 84 is formed from silicone. Alternatively, O-ring 84 may be formed from various other polymeric materials, or from various other materials suitable for sealing between the lens 56 and the lens housing 50. The lens 56 may be secured in position using adhesives, or it may be frictionally held or snap-fit in place by appropriately sizing the lens 56 and the first aperture 54.

With the lens 56 in place in the first aperture 54, the distance between the lens 56 and the second end 40 of the light guide 16 may be adjusted by manipulating the threaded first end 46 of the ferrule 42 into or out of the second aperture 60 of the lens housing 50. Once the desired spacing is obtained, the relative positions of the second end 40 of the light guide 16 and the lens 56 may be fixed by securing the second end 40 of the light guide 16 to the second end 58 of the lens housing 50 using adhesives or by other suitable methods.

With continued reference to FIGS. 2 and 3, a radially outwardly extending tongue 86 projects from the second end 58 of the lens housing 50 to facilitate coupling the lens housing 50 with the mounting fixture 14. A bore 88 is formed through the tongue 86 in a direction perpendicular to the central axis 90 through the lens housing 50 and is sized to receive a fastener therethrough, such that the lens housing 50 may be pivoted about an axis 92 extending along the bore 88, as will be described in more detail below. In the embodiment shown, the lens housing 50 is formed from a thermoplastic resin, such as VALOX, available from the General Electric Company, New York, N.Y. It will be appreciated, however, that various other polymeric materials may be used to form the lens housing 50, and that the lens housing 50 may alternatively be formed from metal, ceramic, or various other materials suitable for forming the lens housing 50.

Referring again to FIGS. 1 and 2, the illumination assembly 10 further includes a fixture 14 for mounting the lens housing assembly 12 to a user-wearable device, such as the bridge 100 of a pair of eyeglasses. In the embodiment shown, the fixture 14 includes a clip member 110 for securing the assembly to a user-wearable device, and yoke 112 extending from the clip member 110 for coupling to the lens housing assembly 12. The clip member 110 may be mounted directly to the user-wearable device, or it may be mounted to an adapter configured to be secured to the user-wearable device. In the embodiment shown, the fixture 14 includes an adapter in the form of a bridge mount 114 that can be attached to the bridge 100 of a pair of eyeglasses and is configured to receive the clip member 110.

Figure 6:
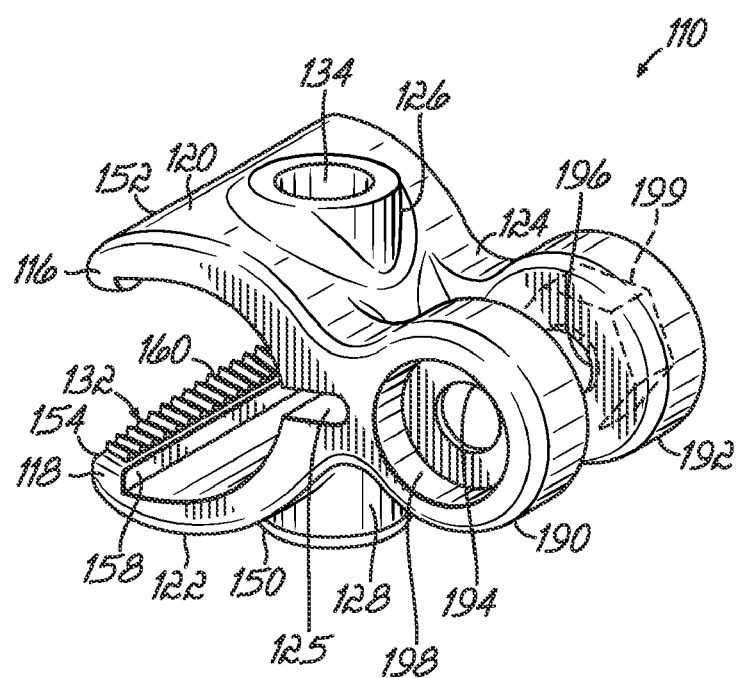
FIG. 6 is a perspective view of a clip member of the illumination assembly of FIG. 1.
Figure 7:
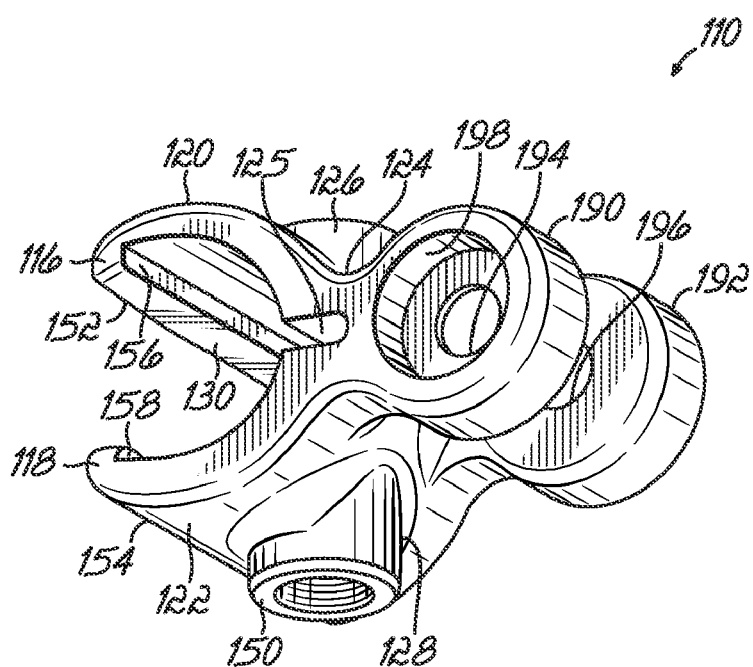
FIG. 7 is a perspective view similar to FIG. 6, illustrating the clip member viewed at a lower elevation.

With reference to FIGS. 2, 6, and 7, the clip member 110 comprises spaced-apart, confronting, upper and lower jaws 116, 118 that may be selectively adjusted toward or away from one another to thereby clamp onto the bridge mount 114. It will be recognized that the upper and lower jaws 116, 118 may alternatively be configured to clamp directly to the user-wearable device. The upper and lower jaws 116, 118 are disposed on the distal ends of respective upper and lower arcuately-shaped clamp arms 120, 122, each of which extends from a central portion 124 of the clip member 110. Each jaw 116, 118 projects inwardly from its respective clamp arm 120, 122, in a direction toward the oppositely disposed jaw. A slot 125 is formed through the central portion 124 of the clip member 110, at the apex of the upper and lower clamp arms 120, 122, to facilitate flexure of the upper and lower jaws 116, 118 toward and away from one another.

A generally cylindrically-shaped boss 126, 128 extends from each of the upper and lower clamp arms 120, 122, in a direction generally away from the clamping surface 130, 132 of its associated jaw 116, 118. An aperture 134 formed through the boss 126 on the upper clamp arm 120 accommodates a thumbscrew 136 that extends through the aperture 134 and across the space between the upper and lower clamp arms 120, 122. As best depicted in FIGS. 2 and 3, the thumbscrew 136 has an enlarged head 138 at a first end 140. Knurls 142 are formed into the head 138 to facilitate manipulation of the thumbscrew 136 by the fingers of a user without the need for any tools. An elongate shank 144 extends from the head 138, and external threads 146 are formed into the shank 144 at the second end 148 of the thumbscrew 136. A threaded insert 150, best seen in FIGS. 3 and 7, is provided in the boss 128 on the lower clamp arm 122. The insert 150 has internal threads corresponding to the external threads 146 formed on the thumbscrew 136. By manipulating the thumbscrew 136, a user can thread the shank 144 into and out of the threaded insert 150 and thereby adjust the relative positions of the upper and lower jaws 116, 118.

As best depicted in FIG. 11-13, the distal edge surfaces 152, 154 of the upper and lower jaws 116, 118 are curved, with the radii of curvature extending in a direction opposite the open end of the clamping arms 120, 122. The side surfaces 156, 158 of each jaw 116, 118, opposite the respective distal edge surfaces 152, 154, are substantially straight. The sides surfaces 156, 158 may alternatively incorporate a small amount of taper to facilitate manufacture of the clip member 110 in a molding process. The upper jaw 116 has a generally flat clamping surface 130 and the clamping surface 132 of the lower jaw 118 is provided with a plurality of V-groove-shaped teeth 160.

In one embodiment, clip member 110 is formed from DELRIN, although it will be recognized that various other polymeric materials may be used. Alternatively, clip member 110 may be formed from various other materials suitable for attaching lens housing assembly 12 to a user-wearable device.

With reference to FIGS. 8, 9, 11, and 12, the bridge mount 114 of the exemplary embodiment has a generally rectangular box shape, with oppositely disposed upper and lower surfaces 170, 172, oppositely disposed front and back surfaces 174, 176, and oppositely disposed ends 178, 180. In one embodiment, bridge member 114 is formed from ZYTEL, although it will be recognized that various other polymeric materials may be used. Alternatively, bridge member 114 may be formed from various other materials suitable as an adapter for coupling clip member 110 to a user-wearable device. Bridge member 114 may include counter-bored through-holes 115 to facilitate mounting the bridge member 114 to a user-wearable device.

In the embodiment shown, upper and lower slots 182, 184 are formed into the upper and lower surfaces 170, 172 of the bridge mount 114, respectively, and are sized to receive a corresponding one of the upper and lower jaws 116, 118 of the clip member 110. As best depicted in FIG. 9, the lower slot 184 includes V-shaped teeth 186 configured to mate with the teeth 160 formed on the lower jaw 118 of the clip member 110. The upper slot 182 has a generally flat surface 188 for engaging the flat clamping surface 130 of the upper jaw 116. The upper and lower slots 182, 184 are formed with generally arcuate shapes that correspond to the curved distal end surfaces 152, 154 of the upper and lower jaws 116, 118. When the upper and lower jaws 116, 118 are seated within the respective slots 182, 184 of the bridge mount 114, with the curved surfaces 152, 154 of the jaws 116, 118 engaging the arcuate sidewalls of the slots 182, 184, angular adjustment of the illumination assembly 10 about a substantially vertical axis can be accomplished by sliding the jaws 116, 118 laterally within the respective slots 182, 184, as depicted in FIG. 13.

The teeth 160 of the lower jaw 118 and the teeth 186 formed in the lower slot 184 extend along radial lines emanating from centers that correspond to the centers of curvature of the distal end surfaces 152, 154 of the jaws 116, 118 so that the teeth will engage when the jaws 116, 118 are laterally adjusted within the slots 182, 184. When a desired position of the illumination assembly 10 is attained, the jaws 116, 118 may be clamped tightly against the bridge mount 114 using the thumbscrew 136 to hold the illumination assembly 10 in the desired position.

Referring again to FIGS. 6 and 7, the clip member 110 further includes first and second spaced-apart clevis arms 190, 192 extending from the central portion 124 and in a direction opposite the upper and lower clamp arms 120, 122. The clevis arms 190, 192 are oriented generally 90 degrees from the upper and lower clamp arms 120, 122. Respective bores 194, 196 formed through the first and second clevis arms 194, 196 are sized to receive a fastener therethrough. Corresponding recesses 198, 199 provided in the outwardly facing surfaces of the clevis arms 192, 194 are shaped to receive a head of a fastener and/or a hex-shaped nut therein.

Referring now to FIGS. 2, 3, and 10, the mounting fixture 14 further includes a yoke 112 pivotally coupled to the clip member 110 and to the lens housing 50. The yoke may be formed from ZYTEL, various other polymeric materials, or other materials suitable for supporting the lens housing assembly 12 and coupling the lens housing assembly 12 to the clip member 110. In the embodiment shown, the yoke 112 comprises a bent, elongate yoke arm 200 having first and second ends 202, 204. The first end 202 of the yoke arm 200 is configured to be received between the first and second clevis arms 190, 192 of the clip member 110 and has a bore 206 formed therethrough. The yoke 112 is secured to the clip member 110 by aligning the bore 206 through the first end 202 of the yoke arm 200 with the bores 194, 196 through the first and second clevis arms 190, 192 and inserting a fastener, such as a screw or bolt 208, through the aligned bores 194, 196, 206. Coupled in this fashion, the yoke 112 may be pivoted about an axis 210 extending generally along the centerline of the aligned bores 194, 196, 206. When the illumination assembly 10 is attached to a user-wearable device 11, the axis 210 will be substantially horizontal. The first end 202 of the yoke arm 200 may be tightly clamped between the first and second clevis arms 190, 192, by threading screw 208 into an associated nut or other mounting hardware, to fictionally engage the yoke 112 and thereby maintain a desired angular orientation of the yoke 112 relative to the clip member 110.

The second end 204 of the yoke arm 200 comprises first and second spaced-apart clevis arms 212, 214. Respective bores 216, 218 formed though the first and second clevis arms 212, 214 are aligned along an axis 220 that is substantially parallel to the axis 210 through the first and second clevis arms 192, 194 of the clip member 110, such that the axis 220 through the yoke clevis arms 212, 214 is substantially horizontal when the mounting fixture 14 is secured to the user-wearable device 11. The lens housing 50 is pivotally coupled to the second end 204 of the yoke arm 200 by inserting the tongue 86 of the lens housing 50 between the first and second clevis arms 212, 214 of the yoke 112, aligning the respective bores 88, 216, 218, and inserting a fastener 224 through the aligned bores 88, 216, 218. The fastener 224 may be threadably, adjustably secured to the yoke 112 using a nut or other appropriate hardware. In the embodiment shown, recesses 226, 228 are formed in the outwardly facing portions of the first and second clevis arms 212, 214 and are sized and shaped to receive the head of the fastener and/or a corresponding nut. Coupled in this fashion, the lens housing 50 may be pivoted about the axis 220 extending through the respective bores 88, 216, 218 of the housing tongue 86 and the first and second clevis arms 212, 214. When the lens housing 50 has been adjusted to a desired orientation, the fastener 224 may be tightened to clamp the housing tongue 86 between the first and second clevis arms 212, 214.

An illumination assembly 10 in accordance with the principles of the present invention, such as that described above, provides a convenient, lightweight and easily adjustable source of illumination that may be removably secured to a user-wearable device. The illumination assembly 10 provides bright illumination of a desired target area from a lens housing 50 that is substantially smaller than those provided on conventionally available illumination devices. The small size and light weight of the illumination assembly 10 ensures increased comfort for users, particularly during the performance of surgical and/or medical procedures where it may be necessary to wear the illumination assembly 10 for long periods of time.

In use, the illumination assembly 10 is easily adjusted to direct light generally along the line-of-sight of the person wearing the device. In particular, the lens housing 50 may be selectively adjusted to align the light projecting from the lens housing 50 in a direction that is coaxial with the user's line-of-sight. This eliminates shadows that would otherwise be created when the projected light is not coaxial with the user's line-of-sight. The lens housing 50 may also be simultaneously or independently pivotally adjusted about two horizontal axes 210, 220, as well as about a vertical axis, such that the position and angle of the lens 56 may be precisely oriented as desired by a particular user. Because the light source is located remote from the illumination assembly 10, there is no additional weight that needs to be supported by the user, and heat is kept away from the users head and face.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the general inventive concept.

What is claimed is:

1. A mounting fixture for supporting a light on a user-wearable device, comprising:

a first portion adapted to be coupled to the user-wearable device;

a second portion coupled to said first portion for pivotal movement relative to said first portion about a first axis; and a third portion coupled to said second portion for pivotal movement relative to said second portion about a second axis that is orthogonal to said first axis;

wherein said second portion comprises first and second opposing jaws arranged to clamp said first portion therebetween; and wherein said first portion comprises first and second oppositely disposed slots, each of said first slot and said second slot configured to receive a respective one of said first and second jaws; wherein said first and second jaws and said first and second slots have complementary interengaging arcuate shapes, whereby the light is adjustable about a substantially vertical axis by sliding said first and second jaws along said respective first and second slots.

2. The mounting fixture of claim 1, wherein said first and second jaws are movable toward one another by flexural bending of said second portion.

3. The mounting fixture of claim 1, further comprising:
a plurality of first teeth on said first jaw;
a plurality of second teeth on said first slot, said second teeth complementary to said first teeth to intermesh with said first teeth when said first jaw is received in said first slot.

4. The mounting fixture of claim 3, wherein said second jaw and said second slot have substantially flat mating surfaces.

5. The mounting fixture of claim 3, wherein said first and second teeth are aligned along directions emanating radially from respective centers of curvature of said arcuate shaped first jaw and said arcuate shaped first slot.

6. A user-wearable illumination assembly, comprising:
a mounting fixture adapted to be coupled to a user-wearable device, said mounting fixture including:
a first portion adapted to be coupled to the user-wearable device,
a second portion coupled to said first portion for pivotal movement relative to said first portion about a first axis, and
a third portion coupled to said second portion for pivotal movement relative to said second portion about a second axis that is orthogonal to said first axis;
a lens housing coupled to said mounting fixture;
a light guide having a first end adapted to be coupled to a light source, and having a second end coupled to said lens housing; and
an optical lens disposed in said lens housing and cooperating with said light guide to project light from the light source through said lens, said lens having a substantially spherical surface facing said second end of said light guide, and an aspheric surface facing away from said second end of said light guide;
wherein said second portion comprises first and second opposing jaws; and
said first portion comprises first and second oppositely disposed slots, each of said first slot and said second slot configured to receive a respective one of said first and second jaws.

7. The illumination assembly of claim 6, wherein said first and second jaws and said first and second slots have complementary interengaging arcuate shapes, whereby said lens housing is adjustable about a substantially vertical axis by sliding said first and second jaws along said respective first and second slots.

8. The illumination assembly of claim 6, wherein said first and second jaws are movable toward one another by flexural bending of said second portion.

9. The illumination assembly of claim 6, further comprising:
a plurality of first teeth on said first jaw;
a plurality of second teeth on said first slot, said second teeth complementary to said first teeth to intermesh with said first teeth when said first jaw is received in said first slot.

10. The illumination assembly of claim 9, wherein said second jaw and said second slot have substantially flat mating surfaces.

11. The illumination assembly of claim 9, wherein said first and second teeth are aligned along directions emanating radially from respective centers of curvature of said arcuate shaped first jaw and said arcuate shaped first slot.

12. A user-wearable illumination assembly, comprising:
a mounting fixture couplable to a user-wearable device, said mounting fixture comprising:
a first portion adapted to be coupled to a user-wearable device,
a second portion coupled to said first portion for pivotal movement relative to said first portion about a first axis, and
a third portion coupled to said second portion for pivotal movement relative to said second portion about a second axis that is orthogonal to said first axis;
a lens housing coupled to said third portion of said mounting fixture;
a light guide having a first end adapted to be coupled to a light source, and having a second end coupled to said lens housing; and
an optical lens disposed in said lens housing and cooperating with said light guide to project light from the light source through said lens;
wherein said first and second axes are spaced from one another;
wherein said first axis is substantially vertical when said mounting fixture is coupled to the user-wearable device; and
wherein said lens housing is coupled to said third portion for pivotal movement relative to said third portion about a third axis that is substantially parallel to said second axis such that an angular orientation of a central axis of said lens housing about said third axis is selectively adjustable.

13. The illumination assembly of claim 12, wherein said optical lens is configured to project a light spot through said optical lens such that the light spot is defocused and has aberrations introduced at a target distance.

* * * * *